United States Patent [19]
Azbell

[11] Patent Number: 5,094,065
[45] Date of Patent: Mar. 10, 1992

[54] MULCHING ROTARY LAWN MOWER BLADE

[75] Inventor: Charles G. Azbell, Hilton, N.Y.

[73] Assignee: Foley-PLP Company, Rochester, N.Y.

[21] Appl. No.: 564,896

[22] Filed: Aug. 6, 1990

[51] Int. Cl.$^5$ ............................................. A01D 34/82
[52] U.S. Cl. ........................................ 56/255; 56/295
[58] Field of Search ........ 56/255, 17.5, 295, DIG. 17, 56/DIG. 20

[56] References Cited

U.S. PATENT DOCUMENTS

| | | | |
|---|---|---|---|
| 2,791,080 | 5/1957 | Shaw . | |
| 2,836,024 | 5/1958 | Davis . | |
| 3,242,660 | 3/1966 | Gary . | |
| 3,338,039 | 8/1967 | Nightingale et al. | 56/295 |
| 3,884,020 | 5/1975 | Dahl | 56/320.2 |
| 3,910,017 | 10/1975 | Thorud et al. | 56/295 |
| 4,189,903 | 2/1980 | Jackson | 56/255 |
| 4,205,512 | 6/1980 | Thorud | 56/13.4 |

Primary Examiner—Terry L. Melius
Attorney, Agent, or Firm—Martin Lukacher

[57] ABSTRACT

A mulching blade for a lawn mower having a housing which is mounted on the shaft of the lawn mower motor below the deck of the housing. The housing has a skirt with a opening. The opening may be closed by mulching door having holes therein which contains the grass clippings in the housing while releasing air pressure during mulching operations. The blade has outer and inner sections which extend radially inward from the tips thereof. The outer section is pitched upwardly with respect to the ground so as to lift the clipping as they are cut by a cutting edge extending along one edge of the sections. The inner section is pitched downwardly so as to push clippings which are recut by the cutting edge along the inner section towards the ground. The inner section may be inclined longitudinally of the blade with respect to the horizontal, preferably downwardly towards the tip of the blade so as to improve the distribution of the clippings on the ground, spreading them out over a wider swath than would be the case with a flat section. The inner section is formed with a dip extending downwardly which increases in depth and width in a direction away from the cutting edge. This dip forms a trough or tunnel which reduces the pressure above the blade in the housing keeping clippings suspended for multiple cuts in the inner section and then blowing them in a wide swath downwardly towards the ground. The corners of the blade at the tip opposite to the cutting edge are inclined upwardly and inwardly to direct the clippings inwardly for multiple cuts by the cutting edge in the inner section of the blade.

18 Claims, 2 Drawing Sheets

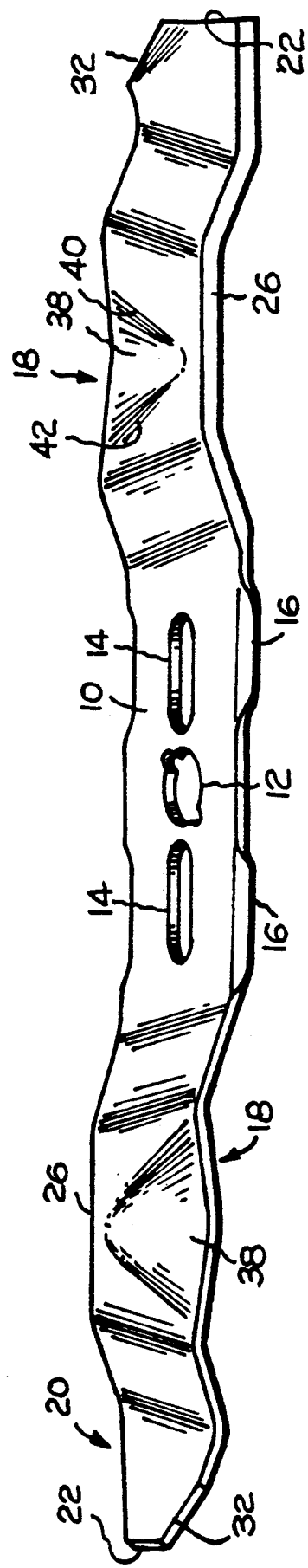
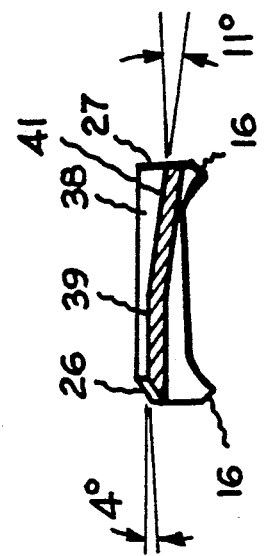
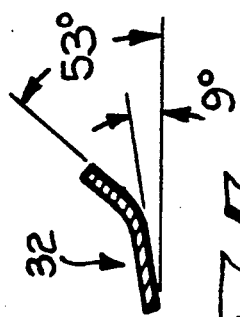

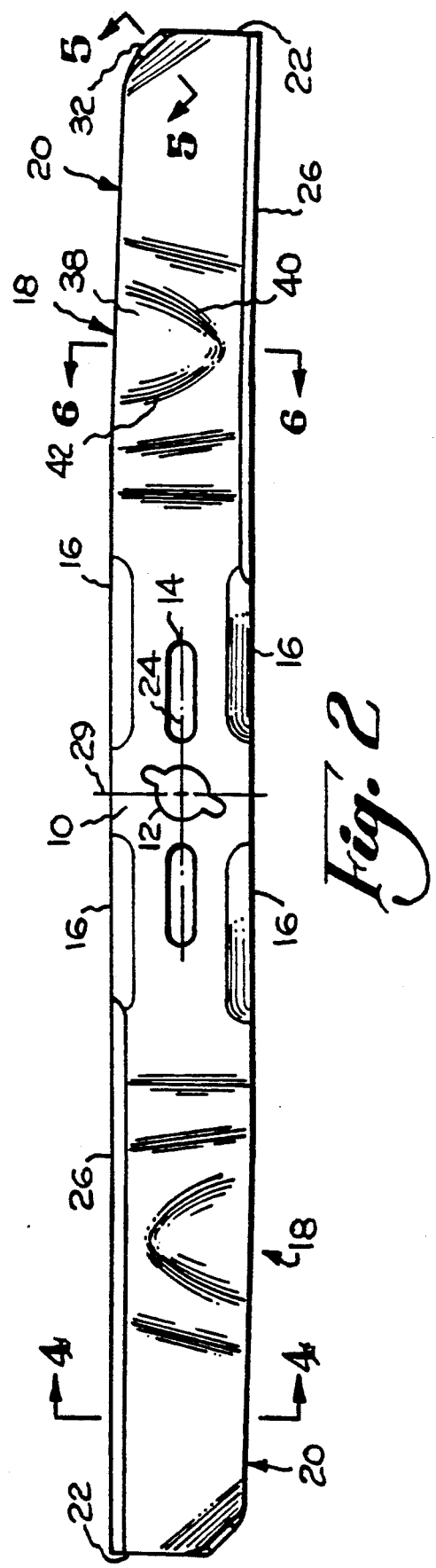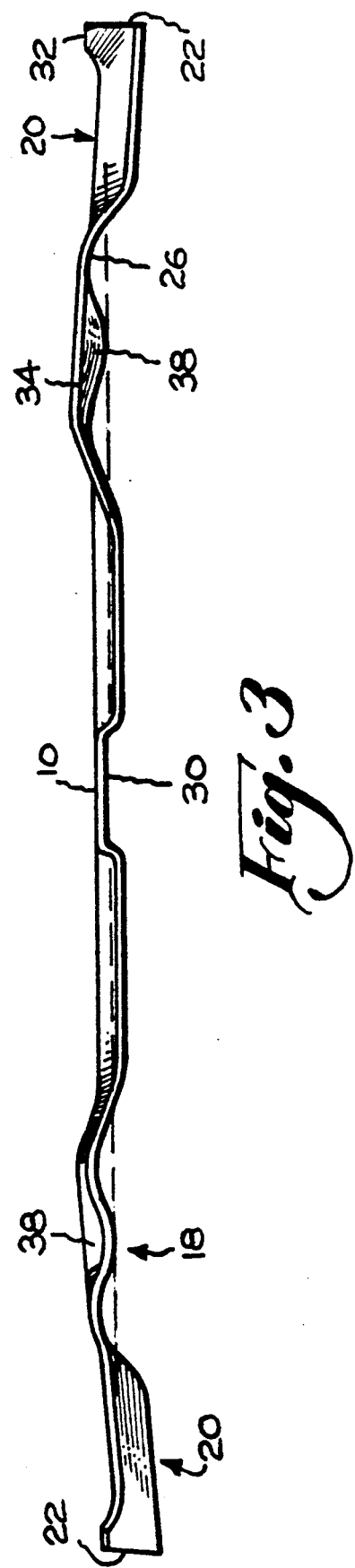

MULCHING ROTARY LAWN MOWER BLADE

DESCRIPTION

The present invention relates to lawn mower blades and particularly to mulching blades for rotary lawn mowers.

The invention is especially suitable for use in converting a bagging or side discharge rotary lawn mower into a mulching mower which repeatedly cuts and comminutes clippings and distributes them back into the grass at soil level for forming a mulch.

Environmental concerns, particularly the lack of landfill capacity, has resulted in legislation in some communities precluding the disposal of grass clippings produced during lawn mowing operations in landfills. Mulching lawn mowers have heretofor been proposed. However, they have been expensive, requiring specially designed lawn mower housings with baffles in order to avoid thee generation of clumps instead of a fine discharge of comminuted clippings suitable for mulch. See U.S. Pat. Nos. 4,189,903 issued Feb. 26, 1980 and 4,205,512 issued June 3, 1980 to Jackson et al. and Thorud, respectively. It is desirable that the needed finely distributed clippings be provided by the operation of the lawn mower blade alone without special baffles or vanes in the lawn mower housing. It has been proposed to provide special mulching blades with up-pumping sections which lift cut grass at the outsides thereof and down-pumping sections which push recut grass downwardly towards the ground. Such blades have, however, been subject to clogging and produce undesired clumps, especially when the grass being cut is high or wet.

It is the principal object of the present invention to provide an improved mulching rotary lawn mower blade which produces a fine mulch of grass clippings and distributes them evenly into the uncut grass at soil level without clogging in the lawn mower housing and without producing clumps of clippings.

It is a still further object of the present invention to provide an improved mulching lawn mower blade which is more effective in mulching clippings and distributing them back into the grass at soil level than mulching blades which have heretofore been proposed. It is a still further object of the present invention to provide an improved mulching rotary lawn mower blade in which a fine mulch of clippings and a wide distribution of the mulch is obtained by virtue of the operation of the blade itself so as to enable conventional bagging or side discharge mowers to be converted into mulching lawn mower merely by replacement of the blades therein with a blade embodying the invention.

It is a still further object of the present invention to provide an improved mulching lawn mower blade which can be produced with equipment which is used for producing conventional lawn mower blades by pressing the blades from strips of sheet steel stock.

Briefly described, a mulching lawn mower blade embodying the invention has a central mounting section which is attachable to a lawn mower motor drive shaft. The blade has first and second sections respectively further outward from the mounting section. The first section and the second section both have cutting edges which may continuously run along one of the opposite edges of the blade and encounter the grass as the blade is rotated. The first section is an inner section while the second section is the outer section of the blade which extends to the tip. Preferably the corner of the outer section at the tip is inclined inwardly to form a sail which moves the cuttings inwardly towards the inner section for multiple cuts and distribution of the clippings (the mulch) back into the grass at soil level. The inner section is preferably inclined downwardly so that its inner end is further from the ground than its outer end. Inclination facilitates the spreading of the clippings as they are blown back into the grass in a wide swath (which is wider than would be the case if the inner section were horizontal). A trough or dip is provided in the inner section which tapers downwardly and widens in a direction from the cutting edge towards the edge of the inner section opposite from the cutting edge. This trough forms a tunnel which reduces the pressure (the Bernoulli's effect is presently believed to be in part responsible for this pressure reduction) thereby keeping the clippings suspended for multiple cuts and distributing the mulch back into the grass in a wide swath. Actual tests on the blade have demonstrated that it is more effective in providing a fine mulch and avoiding clogging or clumping than mulching lawn mower blades which have heretofore been provided.

The foregoing and other objects, features and advantages of the invention, as well as a presently preferred embodiment thereof will become more apparent from the reading of the following description in FIG. 1 is a perspective view of a mulching lawn mower blade embodying the invention;

FIG. 2 is a plan view of the blade shown in FIG. 1;

FIG. 3 is an elevational view of the blade shown in FIG. 1;

FIGS. 4, 5, and 6 are respectively sectional views taken along the lines 4—4, 5—5 and 6—6 in FIG. 2.

Referring more particularly to the drawings, there is shown a mulching rotary lawn mower blade having a mounting section or area 10 with a center hole twelve of universal design which is adapted to be received in most lawn mowers for mounting the blade on the motor drive shaft within the housing of the lawn mower. The housing has a skirt along the side thereof with an opening through which grass is normally discharged. During mulching operations, a mulching door is preferably used to close the opening. The door preferably has a matrix of holes which contain the grass while releasing air pressure during mulching operations. This door is not shown in the drawings and neither is the lawn mower and its housing since they are conventional and may be found in the prior art, for example, in the patents cited above.

The center hole has ears for receiving drive lugs and there are side slots 14 in which other drive lugs may be used if the lawn mower is equipped to require such slots for mounting the blade. The mounting section may have lips 16 for strengthening purposes. The mounting section may be reduced in diameter or increased depending upon the diameter of the blade. For example, a 22-inch blade may have a 6-inch (3 inches on either side of the axis of rotation) mounting area. An 18-inch blade may have a mounting area which is only 2 inches in diameter (1 inch on either side of the axis of rotation).

Extending from the mounting area are first or inner and second or outer sections 18 and 20. These sections may each be approximately 4 inches in diameter. The outer section 20 extends to the tip at the ends 22 of the blade. It is preferable to have symmetrical inner and outer sections 18 and 20, although in principal only the part of the blade on one side (along one radius) of the blade need be designed for cutting purposes.

The blade is formed by pressing from a strip of steel (e.g. cold rolled steel); e.g., Type 1065 steel, hardness R-C-35-40 which is 0.135 inches thick by 2 inches wide. The longitudinal center line 24 extends along the middle of the width of the blade and is perpendicular to the lateral center line 29 which extends between the opposite edges of the blade. The axis of rotation is at the intersection of these center lines 24 and 29.

The blade has cutting edges 26 which extend from the tips 22 over the entire length of the inner and outer sections 18 and 20. The cutting edges are made by milling a bevel across the inner and outer sections along the leading edge of the blade before the blade is formed so that the outer section 20 is pitched upwardly from its leading edge (the cutting edge 26) to its lagging edge opposite to the cutting edge. The inner section 18 is pitched in the opposite direction downwardly from the cutting edge to the edge opposite the cutting edge. Accordingly, the outer section is up-pumping, providing an upwardly flowing air stream
lifts the clippings, while the inner section is down-pumping and pushes or blows the clippings toward the ground. The angle of inclination of the outer section is approximately 16° as shown as in FIG. 4. The inclination of the inner section is preferably less than the inclination of the outer section, for example, approximately 12° with respect to the horizontal. All measurements are made with respect to a generally horizontal plane which is defined by the surface 30 on the bottom of the mounting section 10 (see FIG. 3).

Each tip 22 is formed with a sail at the corner thereof opposite to the cutting edge. The sails 32 provide a further inclination in two steps as shown in FIG. 5 of 9° and 53° (in this example) with respect to the horizontal. The sails 32 further lift the clippings and move them inwardly towards the inner section for multiple cuts by the blade 26 in the inner section 18 to form a fine mulch.

The principal features of the invention reside in the design of the inner section 18. These features are principally the inclination of the inner section and the trough or tunnel 38 which clears from the leading to lagging edges of the inner section along a bisecting line (which is the section line 66 in FIG. 2).

The inclination of the inner section 18 is shown by the portion of the cutting edge 34 in the inner section which is inclined upwardly in a direction from the tip to the axis of rotation. This inclination is at least 4° and for purposes of ease of fabrication and pressing of the blade, is about 5° with respect to the horizontal. The inwardly and upwardly inclined center section has been found to improve the multiple cuts made by the center section of the clippings which are blown towards the center section and are suspended in the vicinity thereof. The inclined center section also deflects and pushes the clipping downwardly towards the ground in a wider swath than would be the case for a horizontal center section thereby more uniformly distributing the clippings back into the grass than a horizontal center section.

The trough or tunnel 38 is a dip in the center section which has been found to keep clippings suspended for multiple cuts. Then the pressure created by the tunnel of moving air created by the trough directs the clippings downwardly in a wide swath distributing them in the grass at soil level. The sides 40 and 42 of the trough form a triangular shape. The sides 40 and 42 are generally curved. The center line through the trough is inclined downwardly as shown in FIG. 6. The troughs are much deeper in the rear at the lagging edge of the blade than at the leading, and cutting edge 26. The trough may have a forward (towards the leading edge) and a rearward, (towards the lagging edge) regions 39 and 41 which are inclined at greater angles with respect to the horizontal, for example 4° and 11° as shown in FIG. 6.

Variations and modifications in the herein described blade, within the scope of the invention, will undoubtedly suggest themselves to those skilled in the art. Accordingly, the foregoing description should be taken as illustrative and not in a limiting sense.

I claim:

1. A mulching rotary lawn mower blade having a central mounting section attachable to a lawn mower motor drive shaft, said blade comprising a first section and a second section, each respectively further outward from said mounting section, said blade having a cutting edge extending along said first and second sections thereof which respectively cut grass clippings and recut said clippings in said second and first sections, said second and first sections being respectively pitched upwardly and downwardly for lifting and downwardly pushing said clippings, and said first section having a trough extending downwardly in a direction away from the cutting edge thereof for directing said clippings above said first section in a downward direction.

2. The blade according to claim 1 wherein said first section is inclined downwardly in a direction outwardly of said blade at an acute angle with respect to the horizontal.

3. The blade according to claim 1 wherein said blade has a tip at the end thereof defining the end of said second section, said tip having corners opposite to said cutting edges, said corners being tilted upwardly to define sails having faces inclined inwardly towards ends of said blade.

4. The blade according to claim 2 wherein said blade has a tip at the end thereof defining the end of said second section, said tip having corners opposite to said cutting edges, said corners being tilted upwardly to define sails having faces inclined inwardly towards ends of said blade.

5. The blade according to claim 2 wherein said mounting section defines a horizontal plane and said angle is greater than 4°.

6. The blade according to claim 5 wherein said angle is about 5°.

7. The blade according to claim 1 wherein said trough widens in a direction away from the cutting edges.

8. The blade according to claim 7 wherein said trough increases in depth in said direction away from said cutting edge.

9. The blade according to claim 1 wherein said trough is generally triangular with curved sides, and dips downwardly in a direction away from said cutting edge at an acute angle with respect to the horizontal plane.

10. The blade according to claim 9 wherein said acute angle is about 11°.

11. The blade according to claim 9 wherein said trough has first and second regions respectively disposed closer and further from said cutting edge, said first and second regions being inclined along a line generally bisecting their said sides at approximately 4° and 11° with respect to a generally horizontal plane.

12. The blade according to claim 11 wherein said bisecting line is perpendicular to said cutting edge.

13. The blade according to claim 1 wherein said first and second sections constitute at least about 50% of the radius of said blade.

14. The blade according to claim 13 wherein said first and second sections are about equal in length radially along said blade.

15. A mulching rotary lawn mower blade having a central mounting section attachable to a lawn mower motor drive shaft, said blade comprising a first section and a second section, each respectively further outward from said mounting section, said blade having a cutting edge extending along said first and second sections thereof which respectively cut grass clippings and recuts said clippings in said second and first sections, said second and first sections being respectively pitched upwardly and downwardly for lifting and downwardly pushing said clippings, and said first section is inclined downwardly in a direction outwardly of said blade at an acute angle with respect to the horizontal.

16. The blade according to claim 15 wherein said angle is greater than about 4°.

17. A mulching rotary lawn mower blade having a central mounting section attachable to a lawn mower motor drive shaft, said blade comprising a first section and a second section, each respectively further outward from said mounting section, said blade having a cutting edge extending along said first and second sections thereof which respectively cut grass clippings and recut said clippings in said second and first sections, said second and first sections being respectively pitched upwardly and downwardly for lifting and downwardly pushing said clippings, said first section being inclined downwardly in a direction outwardly of said blade at an acute angle with respect to the horizontal, said first section having a dip providing a tunnel which extends downwardly in a direction away from said cutting edge thereof.

18. The blade according to claim 17 wherein said tunnel tapers outwardly and is wider at the edge of said first section opposite to said cutting edge thereof.

* * * * *